UNITED STATES PATENT OFFICE.

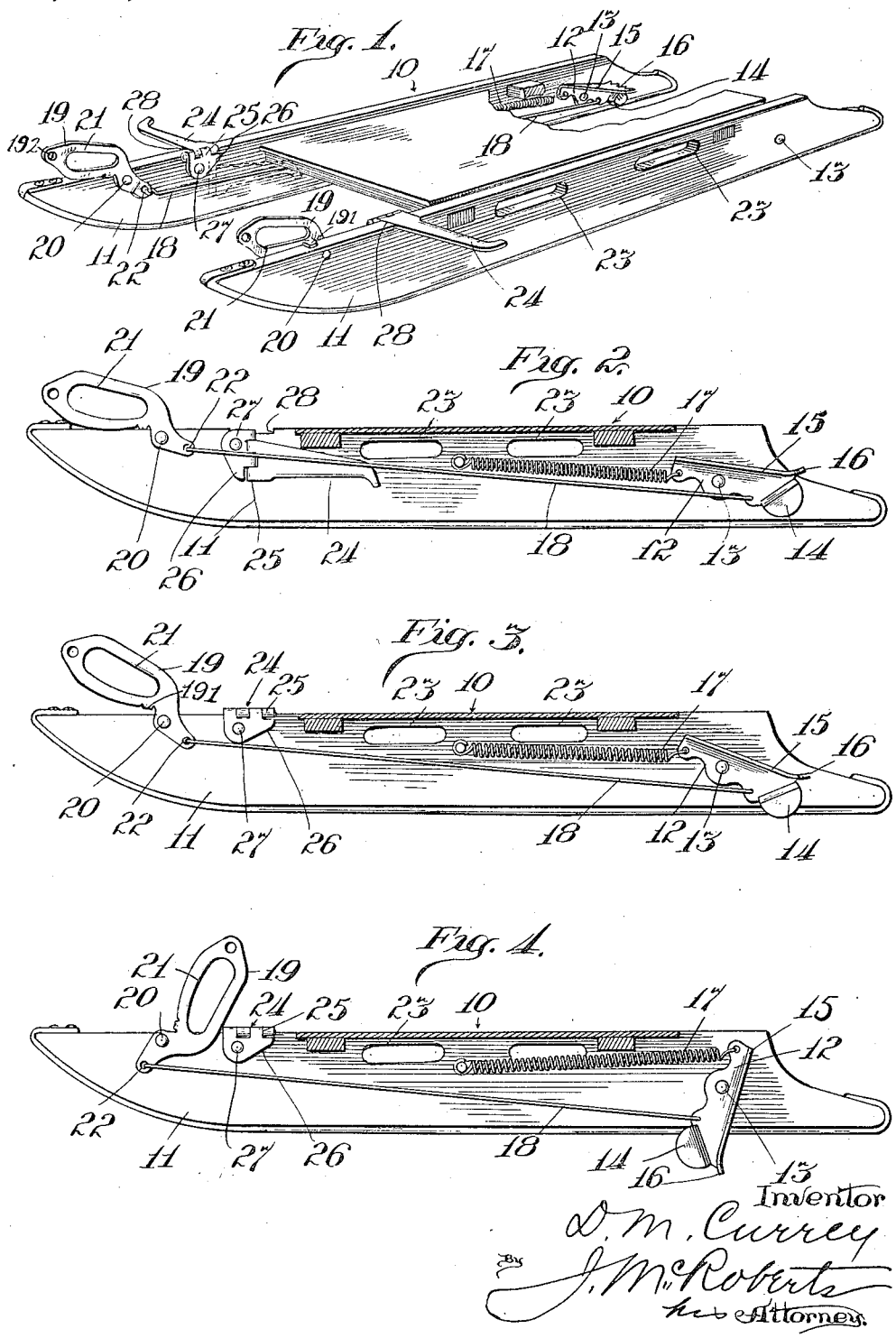

DANNIEL M. CURREY, OF CHICAGO, ILLINOIS.

SLED.

1,288,843.  Specification of Letters Patent.  Patented Dec. 24, 1918.

Application filed September 3, 1918. Serial No. 252,332.

*To all whom it may concern:*

Be it known that I, DANNIEL M. CURREY, citizen of the United States, residing at Chicago, in the county of Cook and State of Illinois, have invented certain new and useful Improvements in Sleds, of which the following is a specification, reference being had therein to the accompanying drawing.

My invention relates to sleds, and its objects are to provide new and improved steering mechanism and stopping or braking devices therefor. The invention consists in the matters hereinafter described and then pointed out in the appended claim.

In the accompanying drawings Figure 1 is a perspective view of a sled equipped with my invention parts being broken away for purposes of better illustration, Fig. 2 is a side view of the inside face of one of the runners showing the parts in their inoperative position, Fig. 3 is a view similar to Fig. 2 showing the parts in steering position, and Fig. 4 is a similar view showing the parts in their braking position.

In the drawing the reference numeral 10 indicates the top of sled of suitable size and dimensions, and 11 indicates the opposite pair of runners of suitable form, which in the present instance are of the one-piece type. Each runner is provided on its inside face with a combined steering and breaking device comprising a metallic angular plate whose vertical web 12 is pivoted to the associated runner at 13 and is provided at its lower portion with a steering head 14, and whose inwardly directed horizontal web 15 terminates in a toothed or serrated outer edge 16 above its head 14, the plate being of such length that when it is swung down on its pivot its steering head will project below or beyond the lower edge of the runner, and when it is turned still further on its pivot its toothed edge will also project below or beyond such edge. Each plate is provided with a retracting coiled spring 17 secured at one end to the inner end of the plate and at its other end to the associated runner and tending to hold the plate in the position shown in Fig. 2 so that its steering head will clear the surface over which the runner is passing. Each steering head is fixed to its plate and its lower surface or periphery is curved in contour so that as the plate is swung down on its pivot toward the surface over which the sled is running it will engage the surface with increasing friction or resistance. Each plate is connected by a link 18 to the lower end of an operating handle 19 which is in the form of a lever intermediately pivoted at 20 to the forward portion of the associated runner so that as the upper end of the handle is drawn back toward the occupant of the sled the plate will be turned on its pivot against the stress of its spring to bring the steering head into engagement with the supporting surface. Each handle is provided with a stop 191 overlying its runner, and with a hand-hole 21, a hole 22 for its link and a hole 192 for a draw cord.

When the sled is in use the springs 17 retract the plates 12 to their inoperative position as shown in Fig. 2. When it is desired to operate either of the steering heads its associated handle is drawn back toward the occupant to lower the head below the edge of its runner, as shown for example in Fig. 3, with the result that the head engages the supporting surface and acts as a drag to turn the sled toward the side on which the head is lowered and thereby steer the course of the sled, the extent to which its direction will be changed or altered depending upon the force of the engagement of the head with the supporting surface. When it is desired to slow down the speed of the sled both handles may be more or less moved to engage both heads with the supporting surface, and when it is desired to stop the sled the handles may be drawn back to position to cause the edges 16 of the plates to pass below the edges of the runners, as shown for example in Fig. 4, to engage the supporting surface.

The runners are provided with hand-holes 23, and with foot-rests 24 which are hinged at 25 to supporting plates 26 pivoted to the runners at 27 so that the rests may be swung down to the position shown in Fig. 2 when not in use and may be swung up and turned outwardly into retaining grooves 28 in the top edges of the runners when in use as shown in Fig. 1.

I claim:—

A sled having an opposite pair of runners, spring-retracted plates pivoted on the runners near their rear ends and having vertical and horizontal webs, steering-heads on the outer ends of the vertical webs below the said horizontal webs, said horizontal webs terminating in serrated ends and the heads and serrated ends of the horizontal webs projecting successively below the edges of the runners when the plates are swung on their pivots to overcome their spring-retraction, handles pivoted on the forward ends of the runners, and links connecting the handles and plates.

In testimony whereof I affix my signature in presence of two witnesses.

DANNIEL M. CURREY.

Witnesses:
J. McROBERTS,
BERNICE GORMLEY.

Copies of this patent may be obtained for five cents each, by addressing the "Commissioner of Patents, Washington, D. C."